3,203,879
METHOD FOR PREPARING POSITIVE ELECTRODES
Gustav A. Mueller, St. Paul, Minn., assignor to Union Carbide Corporation, a corporation of New York
No Drawing. Filed Jan. 17, 1961, Ser. No. 83,146
3 Claims. (Cl. 204—56)

This invention relates to the preparation of electrodes for use in alkaline cells, and more particularly to the preparation of positive electrodes for use in nickel-cadmium secondary cells.

At the present time, positive electrodes designed for use in nickel-cadmium cells are generally prepared by either of the following two methods, both of which are long and laborious and generally require several days to be carried out. In the most common method, a sintered nickel plaque is impregnated with a suitable nickel salt solution, such as a molten or saturated solution of nickel nitrate, which is subsequently converted to nickel hydroxide by electro-chemical polarization or precipitation in an alkaline electrolyte. A more recently developed process calls for the thermal decomposition of a similarly impregnated nickel salt to nickel oxide which is then subsequently converted to nickel hydroxide in a hot caustic bath of sodium hydroxide or potassium hydroxide. In both of these methods, it is necessary for the impregnation and conversion procedure to be repeated a number of times, usually 4 or 5, until the required weight of active material has been deposited in the interstices of the sintered plaque. In addition, each impregnation and conversion must be followed by a washing and drying step to remove any untreated nitrate, which requires considerable expenditure of time and effort. Another disadvantage in these processes is the high cost of the nickel salt of which the impregnating solution is composed. Often, the impregnation takes at reduced pressure thereby requiring additional equipment for production of vacuum and involving additional labor expense.

Accordingly, the principal object of the present invention is to provide a method for producing positive nickel hydroxide electrodes which avoid the disadvantages of the prior art.

A more specific object is to provide a method by which positive nickel hydroxide electrodes may be prepared faster and more economically than by methods of the prior art.

A still more specific object of the invention is to provide a method for producing positive nickel hydroxide electrodes which permit the use of nickel metal rather than a more expensive nickel salt as a source of the active material.

Broadly stated, the objects of the invention are accomplished by a method which comprises immersing a sintered nickel plaque in a molten nickel nitrate hydrate bath in which one or more sheets made of nickel or nickel alloy are also immersed. Electrodeposition is carried out using the nickel sheets as the anode and the sintered nickel plaque as the cathode. Nitric acid is added to the solution during electrodeposition to maintain a proper pH level. The deposit which forms in the interstices of the sintered nickel plaque is an active material which is suitable for use as the positive electrode of an alkaline cell after any excess nitrate has been removed.

To practice the method of the invention, a sintered nickel plaque is immersed in a molten nickel nitrate hydrate bath. One or more sheets of nickel or nickel alloy are immersed in the same bath, preferably one on each side of the plaque. Electrodeposition is then carried out at a current density from as low as .06 ampere per square inch to as high as 5 amperes per square inch of cathode area using the nickel sheets as the anode and the sintered nickel plaque as the cathode. In is generally more economical to use high current densities when possible since this reduces plating time and the size of the equipment required. However, too high a current density will reduce the depth of the penetration of the deposit in the interstices of the plaque. Consequently, more of the active nickel material will be deposited on the surface of the plaque rather than down in the interstices where it is desired. Approximately .3 ampere per square inch of cathode area has been found to offer the best compromise between speed of process and quality of deposit.

During electrodeposition, the solution is preferably maintained at a temperature of approximately 100° C. and nitric acid is added continuously to maintain the pH of the solution between 0 and 1.5. Optionally, small quantities of a chloride salt, for example, 20 grams of sodium chloride per liter of plating bath, may be added to inhibit anodic gassing and to improve anodic dissolution and cell conductivity.

The deposit which forms in the interstices of the sintered nickel plaque is an active nickel material which is suitable for use in alkaline cells. Thus, it may be seen that it is not required to make additions of expensive nickel nitrate salt to the solution, since the nickel or nickel alloy anode or anodes is the source of the nickel which plates in the interstices of the cathode, rather than the nickel nitrate salt. Subsequently, the thus plated plaque is removed from the plating bath and any excess nitrate is washed off. It has been found that it is easier to wash off any such excess nitrate from the plated electrodes of the invention as opposed to electrodes which are prepared by the prior art methods of thermal decomposition or polarization of the nitrate wherein residual traces of unreacted nitrate may be trapped at the bottom of the interstices of the plaque. In the subject process any residual nitrate would lie on the surface where it is more readily removable. This is important because it is believed that nitrates are responsible for self-discharge of batteries in which the electrodes are incorporated.

A further advantage inherent in the process of the invention is that the deposition process may be controlled so that the thickness of the completed electrode is substantially the same as the nickel plaque prior to deposition since the deposit will be all in the interstices of the plaque. This situation is advantageous in that thickness control is necessary to accurately forecast the amount of electrode material that may be packed into a given cell container. Further, this is advantageous since any active material which is deposited on the surface of the plaque must be removed to prevent shedding which would cause short circuiting in an assembled galvanic cell. To obtain the best deposition, it has been found desirable to gradually reduce the current as the deposit builds up and the voltage increases. This step tends to maintain uniform current densities per unit of cathode area. The same effect can be achieved by performing the electrode deposition at a pre-selected voltage.

As an example of the invention, the anode and cathode are placed approximately 1.5 inches apart in 8 liters of molten nickel nitrate electrolyte containing initially 2 milliliters of nitric acid and having a pH of .1; the temperature of said solution being maintained at about 100° C. Under these conditions a working voltage of about 8 volts is required for a current density of .9 ampere per square inch of cathode area. These specific conditions in the method of the invention will give a plating efficiency of 90%.

As will be understood by those skilled in the art, control of the quantity of active nickel material formed in the interstices of the sintered nickel plaque is effected by regulation of time and current density of plating. Control of the texture of the deposit is effected by regulation of current density, temperature, and the addition of various agents. These variations in plating conditions do not, of course, affect the basic novelty of the disclosed method and no such limitation is intended.

I claim:
1. A method of preparing a positive electrode for use in nickel-cadmium galvanic cells which comprises the steps of preparing a plating bath of molten nickel nitrate hydrate, immersing in said bath a sintered nickel plaque and at least one sheet of material chosen from the group consisting of nickel and nickel alloys, passing a current through said bath utilizing said sheet as an anode and said plaque as a cathode, and at the same time adding sufficient quantities of nitric acid to said bath to maintain the pH thereof in the range of from 0 to 1.5, thereby causing the formation of an active nickel material in the pores of said plaque, said plaque then being suitable for use as the positive electrode of a nickel-cadmium galvanic cell.

2. The method of claim 1 wherein said current density is in the range of from .06 to 5.0 amperes per square inch of cathode area and said temperature of said plating bath is maintained at about 100° C.

3. The method of claim 2 wherein an anode is provided on each side of said cathode and a small amount of sodium chloride is added to said plating bath.

References Cited by the Examiner

UNITED STATES PATENTS

| | | |
|---|---|---|
| 1,402,751 | 1/22 | Edison. |
| 2,737,541 | 3/56 | Coolidge _____ 136—28 |
| 2,831,944 | 4/58 | Bourgault et al. _____ 136—29 |

OTHER REFERENCES

"Journal of the Electrochemical Society," vol. 94 (1948), pages 289–295, article by Fleischer.

JOHN H. MACK, *Primary Exaimner.*

JOSEPH REBOLD, MURRAY TILLMAN, *Examiners.*